United States Patent [19]
Yano

[11] Patent Number: 5,761,228
[45] Date of Patent: Jun. 2, 1998

[54] OPTICAL CLOCK REGENERATOR

[75] Inventor: Yutaka Yano, Tokyo, Japan

[73] Assignee: NEC Corporation, Tokyo, Japan

[21] Appl. No.: 766,174

[22] Filed: Dec. 12, 1996

[30] Foreign Application Priority Data

Dec. 15, 1995 [JP] Japan .................................. 7-347712

[51] Int. Cl.$^6$ .................................................. H04B 10/12
[52] U.S. Cl. ................... 372/26; 359/158; 359/176; 359/184; 372/25; 372/30; 372/33
[58] Field of Search ........................ 372/9, 18, 25, 372/26, 29, 30, 32, 33, 38, 43, 44, 50; 359/158, 174, 176, 179, 181, 184, 188

[56] References Cited

U.S. PATENT DOCUMENTS

| | | | |
|---|---|---|---|
| 5,349,593 | 9/1994 | Lomashevitch et al. | 372/50 |
| 5,369,520 | 11/1994 | Avramopoulos et al. | 359/176 |
| 5,386,311 | 1/1995 | Shields | 372/38 X |
| 5,446,573 | 8/1995 | Lomashevitch et al. | 359/158 |
| 5,548,433 | 8/1996 | Smith | 359/158 |
| 5,602,862 | 2/1997 | Barnsley et al. | 372/50 X |

FOREIGN PATENT DOCUMENTS

| | | |
|---|---|---|
| 63-177626 | 7/1988 | Japan . |
| 1-150121 | 6/1989 | Japan . |
| 2-126243 | 5/1990 | Japan . |
| 2-183236 | 7/1990 | Japan . |
| 3-66189 | 3/1991 | Japan . |
| 4-25826 | 1/1992 | Japan . |
| 6-13981 | 1/1994 | Japan . |

OTHER PUBLICATIONS

M. Jinno et al., "Optical Tank Circuits Used for All–Optical Timing Recovery", *IEEE Journal of Quantum Electronics*, vol. 28, No. 4, Apr. 1992, pp. 895–900.
Robert Adler, "A Study of Locking Phenomena in Oscillators", *Proceedings of the IEEE*, vol. 61, No. 10, Oct. 1973, pp. 1380–1385.
K. Smith et al., "All–Optical Clock Recovery Using a Mode–Locked Laser", *Electronics Letters*, vol. 28, No. 19, Sep. 10, 1992, pp. 1814–1816.
I. Cha et al., "1.5 βm Band Travelling–Wave Semiconductor Optical Amplifiers With Window Facet Structure", *Electronics Letters*, vol. 25, No. 18, Aug. 31, 1989, pp. 1241–1242.
P.B. Hansen et al., "5.5-mm Long InGaAsP Monolithic Extended–Cavity Laser with an Integrated Bragg–Reflector for Active Mode–Locking", *IEEE Photonics Technology Letters*, vol. 4, No. 3, Mar. 1992.

*Primary Examiner*—John D. Lee
*Attorney, Agent, or Firm*—Sughrue, Mion, Zinn, Macpeak & Seas, PLLC

[57] ABSTRACT

An optical clock regenerator using a laser includes an optical modulator for mode locking in a laser resonator. The optical modulator is driven by an intensity-modulated optical signal. When an intensity-modulated optical data pulse train including a clock frequency component close to a frequency n (n is an integer) times or one-nth times a resonance frequency of the laser resonator is input to the optical modulator, the laser outputs clock pulse light locked by the frequency n times or one-nth times a clock frequency of the optical data pulse train. The optical data pulse train and the laser resonator are spatially separated from each other.

10 Claims, 7 Drawing Sheets

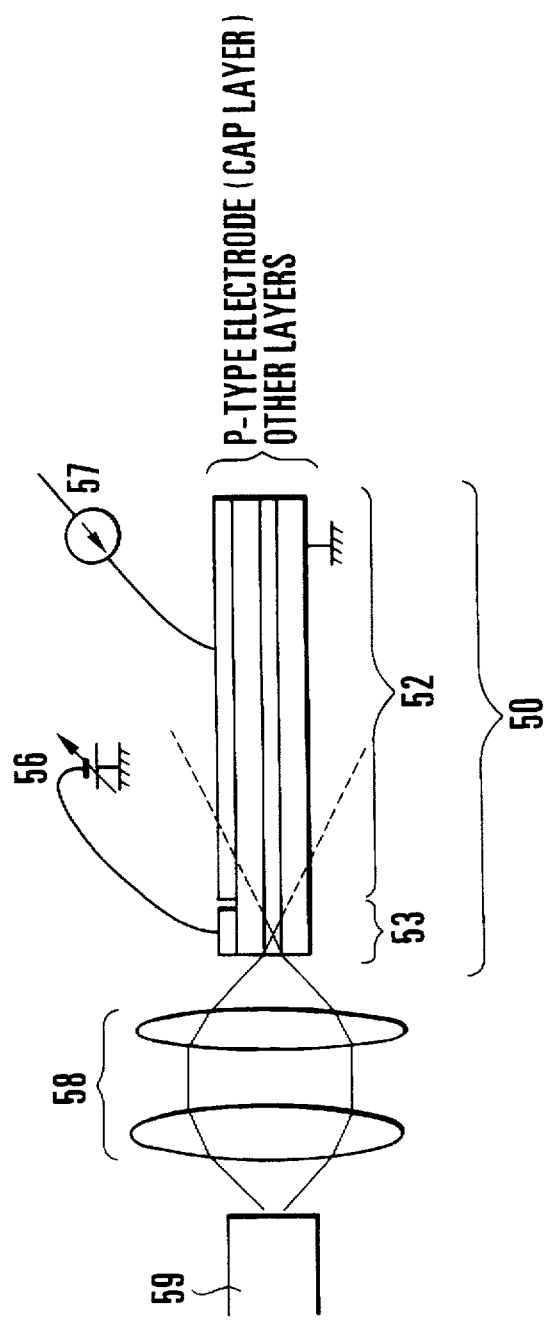
F I G. 5

OPTICAL CLOCK REGENERATOR

BACKGROUND OF THE INVENTION

The present invention relates to an optical clock regenerator and, more particularly, to an optical clock regenerator suitable for a clock regenerating function in the receiving operation of a digital optical transmission system.

<Significance of Optical Direct Clock Regenerating Technique>

An optical On/Off Keying digital transmission system is currently widely used. This coding is to transmit data and a clock simultaneously. In order to perform various types of operations at a receiver, it is indispensable to regenerate a clock from a transmitted data pulse train. This clock regenerating function is conventionally realized by an electrical circuit. However, for the future ultrahigh-speed, large-capacity optical transmission, the operating speed limit of the electrical circuit poses a problem. Therefore, a technique for directly regenerating an optical clock pulse train from an optical data signal train is demanded.

<Clock Component of RZ Optical Data Pulse Train>

The optical data pulse train of a bit rate fm [bit/s] in accordance with RZ [Return to Zero] coding has intensity modulation sidebands about an optical carrier frequency f0 [Hz] as the center when it is considered in terms of the frequency range. This sideband is constituted by continuously, widely distributed data spectral components, and the clock frequency fm [Hz] and the clock spectral components of the harmonics of the clock frequency fm which exist as line spectrum at frequencies remote from the optical carrier frequency f0 as the center by fm, 2×fm, . . . , n ×fm, . . . (n is a natural number).

<Two Prior Art Techniques: Optical Filter Method and Mode-Locked laser Method>

Various methods have conventionally been proposed as techniques for extracting an optical clock pulse train from an optical data pulse train. Among these methods, a method of utilizing the periodic resonant filter characteristics of a Fabry-Perot passive optical resonator and a method of using a mode-locked laser are available as the prior art techniques concerning the subject of the present invention. These methods will be described sequentially.

<Prior Art Technique: Optical Filter Method and Its Problem>

A method of utilizing the periodic resonant filter characteristics of a Fabry-Perot passive optical resonator will be described. This method has conventionally been proposed in, e.g., Japanese Patent Laid-Open No. 2-126243 (Title of the Invention: LIGHT TIMING EXTRACTING CIRCUIT), Japanese Patent Laid-Open No. 63-177626 (Title of the Invention: OPTICAL TIMING EXTRACTING CIRCUIT), Japanese Patent Laid-Open No. 1-150121 (Title of the Invention: OPTICAL CIRCUIT FOR SELF-TIMING EXTRACTION), and the like. For example, Japanese Patent Laid-Open No. 1-150121 proposes an arrangement in which an optical bandpass filter having a high Q value is realized by using an optical loop circuit constituted by an optical directional coupler and an optical delay element, and furthermore a light amplifier, and a locked optical clock signal free from jitter is obtained directly from an input optical signal by combining this optical bandpass filter and a light limiter. Japanese Patent Laid-Open No. 2-126243 mentioned above proposes an arrangement for obtaining a high-speed optical clock pulse locked with an input signal by setting one of the resonance frequencies of an optical resonator, the frequency interval of the resonance peak of which is equal to the clock frequency, to a value equal to the center frequency of the input optical signal.

The operational principle for this method is to input an optical data pulse train to a Fabry-Perot passive optical resonator, to selectively extract the spectral components of the optical carrier frequency f0 and clock frequencies f0±n.fm (n is a natural number) by the periodic resonance filter effect of the Fabry-Perot passive optical resonator, and to remove data spectral components. When this method is used, the following three conditions must be satisfied, as reported by Masahiko Jinno, the inventor of the inventions described in Japanese Patent Laid-Open Nos. 1-150121 and 2-126243 mentioned above, in a reference "Optical Tank Circuits Used for All-Optical Timing Recovery", IEEE Journal of Quantum Electronics, Vol. 28, No. 4, April 1992, pp. 895–900.

1. One of the plurality of resonance frequencies of the optical resonator is adjusted to the center frequency f0 of the input data light.

2. The free spectral range (FSR) of the optical resonator is equal to the clock frequency fm of the input data light.

3. The bandwidth of the input data light is sufficiently narrower than the bandwidth of the optical resonator.

It is difficult to satisfy all these conditions as compared to the clock frequency extracting method using an electrical filter, which is generally used currently. In particular, the first condition cannot be maintained unless using some feedback control system, as proposed in Japanese Patent Laid-Open No. 4-25826 (Title of the Invention: LIGHT TIMING EXTRACTING CIRCUIT) as a technique to stably continue the clock regenerating operation by causing the resonance frequency of the optical resonator to follow the center frequency of the input light. If a feedback control system is provided in this manner, the entire apparatus becomes complicated and expensive. In order to obtain a stable operation as a whole, the number of parameters, e.g., a frequency range within which the resonance frequency of the optical resonator can follow the center frequency of the input light, the response speed of the system, and the like, that need adjustment increases, thus still leaving technical difficulty.

<Prior Art Technique: Mode-Locked Laser Method>

In contrast to the arrangement using the passive optical resonator described above, an arrangement in which an optical amplifier is inserted in a resonator is also proposed (see, e.g., Japanese Patent Laid-Open Nos. 2-183236 and 6-13981). According to this method, since an optical amplifier is introduced, not only a loss is compensated for, but also multi-mode laser oscillation in accordance with the longitudinal mode of the optical resonator occurs, thereby realizing a new function to be described later.

<Operation of Mode-Locked Laser>

Mode-lock oscillation as a special case of multi-mode laser oscillation will be explained. A mode locking operation can be explained in a time region by a model in which an optical pulse makes a round trip in a resonator while maintaining its pulse shape, and in a frequency (optical spectrum) range as a model in which, whereas the phases of multi-mode laser oscillation caused by the plurality of longitudinal modes of the optical resonator originally differ from each other, this laser oscillates to maintain a predetermined phase in the mode-lock state. Mode Locking is realized by intensity modulation and phase modulation. Since a mode locking operation is not always obtained in phase modulation, intensity modulation is mainly used. The concept of intensity modulation can be understood, for example, as follows.

In a laser resonator, a shutter having a thickness much smaller than the length of the resonator is inserted, and light that makes a round trip in the resonator is intensity-modulated (gated) at a timing substantially equal to the round-trip time of light. Then, in a light intensity pattern which repeats with the round-trip time as one period, a portion that tends oscillate occurs fixedly to form an optical pulse. A basic repetition frequency frt of output pulse light can be given by frt=c/(2neff×L) where L is the length of the resonator, neff is an effective refractive index, and c is the light velocity in vacuum. A frequency which is an integer multiple of the frequency frt can also be oscillated, which is called harmonic mode locking.

<Operation Principle of Clock Regeneration by Mode-Locked Laser>

Although clock pulse regeneration by means of data light input to a laser that performs multi-mode oscillation seems close to the optical filter method in its arrangement, it is essentially different in the operational principle. More specifically, in the optical filter method, clock components included in injected light are extracted by a filter to form a clock pulse train. In contrast to this, in a laser that performs multi-mode oscillation, laser oscillation in accordance with the plurality of longitudinal modes exists before light is injected. This is a significant difference.

In order to make pulse light with the output light from the multi-mode oscillation laser, the phases of these modes may be locked. More specifically, if modulation is performed at a frequency close to the frequency interval of the longitudinal modes, a clock pulse train is outputted. Furthermore, when the laser is passive mode-locked, it suffices if a frequency which is self-oscillated is auxiliarily stabilized by an external modulation signal. When a clock frequency component included in the optical data pulse train is used as this modulation signal, a clock regenerator is obtained.

<Injection Locking>

A "pull-in" phenomenon is known in which, to an oscillator that oscillates at a certain frequency and a certain phase, if a signal of a frequency close to this certain frequency is injected from the outside, the frequency and phase of the output signal are locked by those of the injected signal. For example, refer to a reference (R. Adler, "a study of locking phenomena in oscillators", Proceedings of the IEEE, Vol. 61, No. 10, October 1973, pp. 1380–1385). This phenomenon and this scheme are called injection locking. The same phenomenon is known as well in a laser serving as an optical oscillator, and is called optical injection locking. In this phenomenon, the frequency and phase of light oscillated by the laser are locked by those of the injected light. From another point of view, it is possible to say that injected light forms a seed to be amplified in the laser resonator, thus becoming output light. A seed which is obtained in the absence of injected light is spontaneous emission light.

<Reason for Avoiding Optical Injection Locking>

Today, products in which an optical injection locking phenomenon is applied industrially are very few. This is because the operation of a laser which is subjected to optical injection locking is very sensitive to the wavelength or polarization of injected light, like in the case of a passive optical resonator. The reason for this can be as follows. The gain and loss of a laser resonator originally depends on the wavelength and polarization, and a difference in whether oscillation easily occurs depends on the wavelength and polarization. Possible major factors of wavelength dependency and polarization dependency are the resonance characteristics of the optical resonator and the anisotropy of the gain of the gain region in the sectional direction, respectively.

When a laser is not subjected to optical injection locking, it oscillates at a wavelength in a polarized state wherein it can oscillate easiest. When, however, this laser is subjected to optical injection locking, the wavelength and polarization tend to be close to those of the injected light. Note that if the target oscillation state is difficult for the original laser, this pull-in operation is suppressed, and the actual oscillation state balances at a certain degree. In this state, if the wavelength and polarization of the injected light fluctuate, the pull-in tendency changes. As a result, the wavelength and polarization fluctuate largely to become unstable.

An optical injection locking phenomenon can occur even in optical clock regeneration by means of injecting light to a mode-locked laser. However, note that an optical injection locking phenomenon is not required in the operation principle of this method. More specifically, as described above, the injection locking phenomenon utilized in this case is injection locking between intensity envelope signals (also called as "the baseband signals of intensity-modulated signals" in the field of communications), and injection locking of a carrier light is not indispensable. As a matter of course, if locking is performed at an optical level, the higher correlation between input and output light can be expected, so that locking at an optical level may be utilized positively. For this purpose, however, the instability described above must be overcome.

<Prior Art Technique for Avoiding Optical Injection Locking>

The above items will be summarized. In injecting light to a mode-locked laser, if the injected light is spatially coupled to the laser resonator, the injected light forms a seed to resonate in the laser resonator, likely to cause an optical injection locking phenomenon. In the conventional semiconductor mode-locked laser, a portion where light is injected is not particularly provided. Hence, light cannot but be injected reversely from the light output portion. Therefore, the optical injection locking phenomenon cannot be avoided.

As an example of the methods of avoiding the optical injection locking phenomenon, a method of spatially separating the injected light from the laser resonator so the injected light will not be coupled to the laser resonator may be considered. For example, if light is injected sideways from the resonator, it will not be coupled to the resonator. This method is described as a prior art technique in FIG. 11 of Japanese Patent Laid-Open No. 3-66189 (Title of the Invention: SEMICONDUCTOR LASER DEVICE), although the object of which is completely different. According to this prior art technique, the oscillated state and the oscillation stop state of the main laser are switched by injected light, thereby providing a bistable function or the function of logic operation. The object, arrangement, and operation of this prior art technique are different from those of a clock regenerator according to the present invention which performs laser oscillation continuously.

It is apparent that this arrangement in which the injected light and laser-oscillated light are separated spatially cannot be applied to an optical clock regenerator using a passive optical resonator. From this respect, it is understood that the operation principle of the method using a passive resonator and that of the method using a mode-locked laser are fundamentally different from each other.

Another method of avoiding the optical injection locking phenomenon is the method of making the wavelengths of injected light and laser-oscillated light be different from each other, as reported in a reference (K. Smith & J. K. Lucek, "All-Optical Clock Recovery Using a Mode-Locked Laser", Electronics Letters, Vol. 28, No. 19, September 1992, pp. 1814-1816). According to this report, the wavelengths of the injected light and laser oscillation are set to 1.54 μm and to 1.55~1.57 μm, respectively, and injected light is multiplexed/demultiplexed by using a wavelength division multiplex (WDM) optical coupler.

As described above, in a clock regenerator using a conventional mode-locked laser, in the same manner as in the case of a passive optical resonator, the sensitivity characteristics change largely in accordance with whether the frequency of input data pulse light and the resonance frequency of the laser resonator are tuned to each other, thus being unstable. To stabilize the sensitivity characteristics is also deemed to be technically difficult. In a general semiconductor laser, the gain characteristics of the laser resonator in the sectional direction are asymmetrical with respect to the central axis and have polarization dependency. Therefore, polarization dependency of the sensitivity occurs even for injected light. Since the polarized state of received data light fluctuates over time while it propagates through the transmission line, instability is inevitable.

SUMMARY OF THE INVENTION

It is an object of the present invention to provide an optical clock regenerator using a semiconductor laser having a uniform sensitivity for injected light over a wide wavelength range in any polarized state.

It is another object of the present invention to provide an optical clock regenerator which uses a semiconductor laser and which can be easily fabricated as an apparatus.

In order to achieve the above objects, according to the present invention, there is provided an optical clock regenerator using a semiconductor mode-locked laser comprising optical modulating means for mode locking in a laser resonator, wherein the optical modulating means is driven by an intensity-modulated optical signal, and when an intensity-modulated optical data pulse train including a clock frequency component close to a frequency n (n is an integer) times or one-nth times a resonance frequency of the laser resonator is input to the optical modulating means, the mode-locked laser outputs clock pulse light locked by the frequency n times or one-nth times a clock frequency of the optical data pulse train, and the optical data pulse train and the laser resonator are spatially separated from each other.

BRIEF DESCRIPTION OF THE DRAWINGS

FIG. 5 is a diagram schematically showing the arrangement of an optical clock regenerator according to the third embodiment of the present invention;

DESCRIPTION OF THE PREFERRED EMBODIMENTS

The principle and operation of an optical clock regenerator according to the present invention will be described.

The optical clock regenerator of the present invention is based on conventional light injection to a mode-locked laser, and is characterized in that the injected light and the laser resonator are spatially separated or the wavelengths of the injected light and laser-oscillated light are made different so as not to couple the injected light to the laser resonator. The injected light gives an optical modulation effect to the laser for mode locking. However, since the injected light does not resonate in the laser resonator, the instability accompanying such resonance is avoided. As an optical modulating means driven by an optical signal, for example, cross gain modulation in a semiconductor optically amplifying region, and the like are possible.

Figure 1:
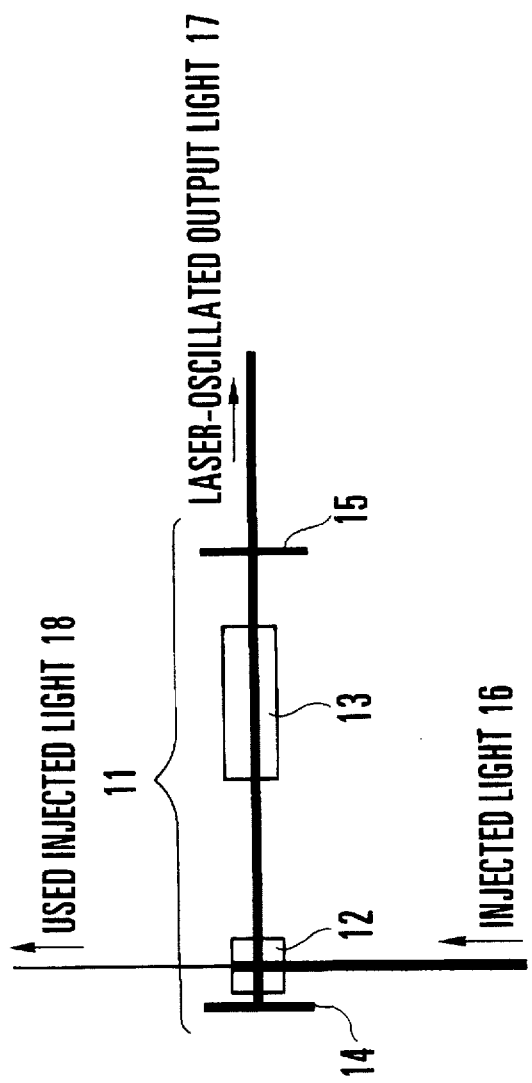
FIG. 1 is a conceptual diagram showing the arrangement of an optical clock regenerator for explaining the first principle of the present invention.

FIG. 1 shows the arrangement of an optical clock regenerator for explaining the first principle of the present invention. Referring to FIG. 1, an optical modulator 12 driven by injected light 16 is provided in a laser resonator 11 that constitutes a mode-locked laser. The optical axis of the laser resonator 11 and the optical path of the beam are set not to coincide with each other so light will not be coupled to the laser resonator 11 when it is irradiated on the optical modulator 12. When the clock frequency of the input data pulse train included in the injected light 16 and the free spectral range of the laser resonator 11 are set to substantially coincide with each other, the laser performs a mode locking operation, and the repetition frequency of this optical clock pulse train is locked by the clock frequency of the input data pulse train. This operation is identical to that described in the description of the prior art technique. Reference numeral 13 denotes a gain medium; 14 and 15, resonator mirrors; 17, a laser-oscillated output; and 18, used injected light that has been used.

Figure 2:
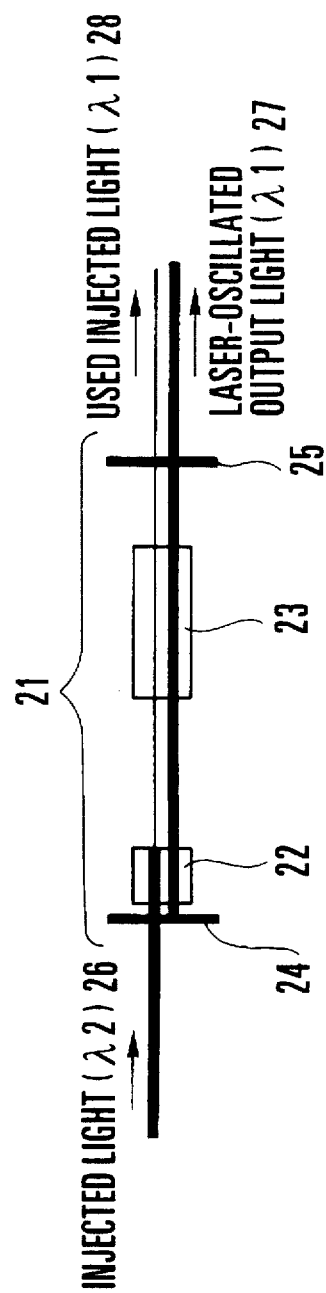
FIG. 2 is a conceptual diagram showing the arrangement of an optical clock regenerator for explaining the second principle of the present invention.

FIG. 2 schematically shows the arrangement of an optical clock regenerator for explaining the second principle of the present invention. The second principle provides a practical method of applying the method of K. Smith and J. K. Lucek that makes the wavelengths of the injected light and oscillated light to be different from each other, which has been described in the description of the prior art, to an apparatus other than a ring laser. Although the optical axis of laser-oscillated output light 27 and the optical path of injected light 26 are shifted from each other in FIG. 2 for the sake of easy understanding, they may overlap each other. The reflectivities of resonant mirrors 24 and 25 constituting a laser resonator 21 are set to be large for an oscillation wavelength and small for the wavelength of the injected light. With this arrangement, although the injected light 26 gives modulation effect to the mode-locked laser, optical injection locking does not occur since the injected light 26 does not strongly resonate in the optical resonator. An optical clock regenerating operation is the same as that shown in FIG. 1 and a description will therefore be omitted.

According to the above arrangement, even when an optical signal is input to the laser, optical injection locking does not occur. Thus, the wavelength and polarization of the laser-oscillated light are determined by the original characteristics of the laser. Even if the wavelength and polarization of the injected light fluctuate, the wavelength and polarization of the laser-oscillated light are not influenced, and the laser performs a stable operation.

In FIGS. 1 and 2, a general Fabry-Perot optical resonator laser comprising two mirror surfaces has been described. However, the present invention is not limited to this, but can be applied to a laser having other resonator arrangements, as a matter of course. The first to third, and seventh embodiments will be described by using the first principle shown in FIG. 1, and the fourth to sixths embodiments will be described by using the second principle shown in FIG. 2.

<First Embodiment>

Figure 3:
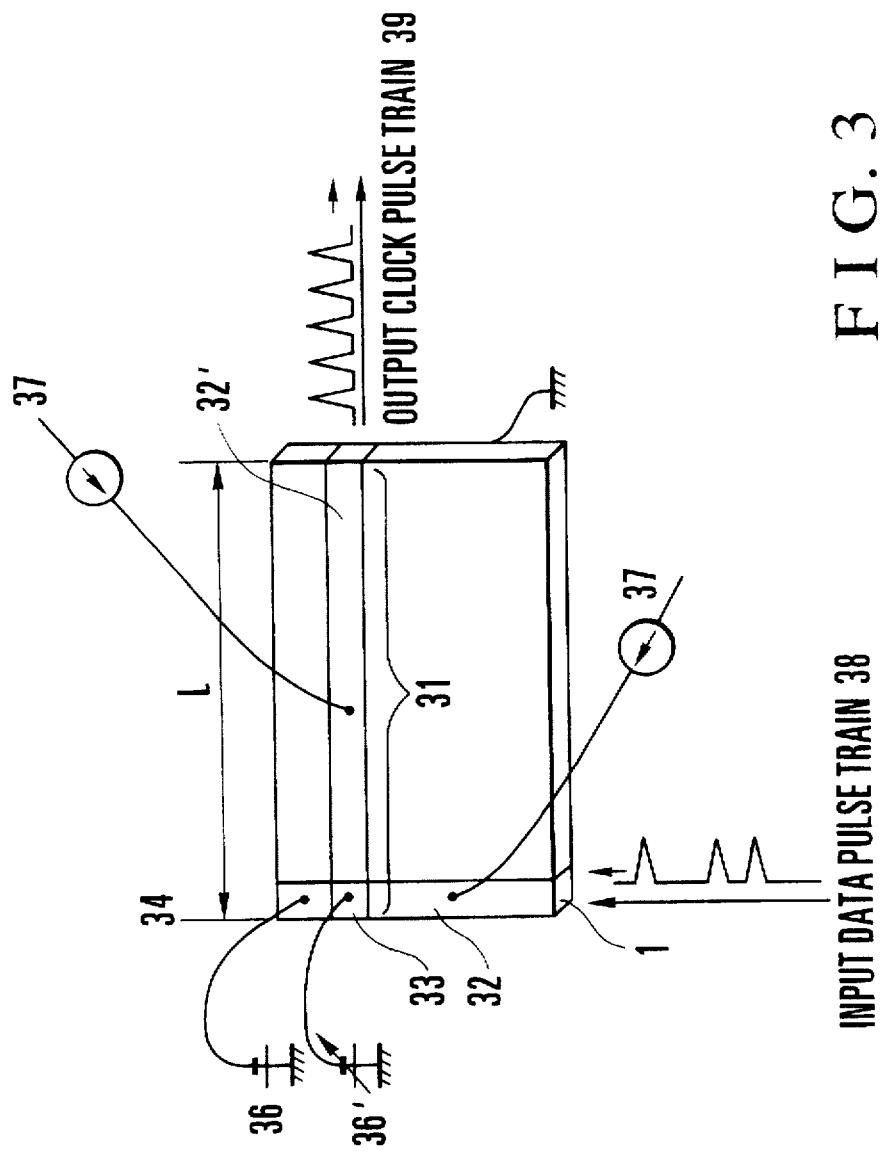
FIG. 3 is a diagram schematically showing the arrangement of an optical clock regenerator according to the first embodiment of the present invention.

FIG. 3 schematically shows the first embodiment of the present invention which uses the first principle shown in FIG. 1. As a mode-locked laser, a semiconductor laser having a quantum-well structure made of InP and InGaAsP and a 1.55-μm band oscillation wavelength is preferably used. In this semiconductor laser, an InP substrate, an n-type InP cladding layer, an active layer having an InGaAs/InP multi-quantum-well (MQW) structure, a p-type InP cladding layer, and a p$^+$-type InP cap layer are sequentially stacked from the lower side. Electrodes are respectively formed on the InP substrate and the cap layer to form n- and p-side electrodes, respectively. The active layer is sandwiched by the n-type cladding layer having a higher refractive index than that of the active layer and the p-type cladding layer to form an optical waveguide. This optical waveguide and a cleavage end facet serving as a partial transmission mirror constitute a laser resonator 31 (corresponding to the laser resonator 11 shown in FIG. 1). The layer structure of the semiconductor laser described above is omitted in FIG. 3.

The laser resonator 31 is entirely filled with an active region which is optically active. Note that since each of the cap layer and the p-side electrode is divided into two regions, i.e., a gain region 32' and a modulation region 33, the active region under the cap layer and the p-type electrode is also separated into two regions, so that the resultant laser resonator serves as a two-electrode laser. A total length L of the resonator is about 4.8 mm, and a longitudinal mode interval frt at this time is about 10 GHz. A modulation region for mode locking is preferably adjacent to the resonator mirror from a reason to be described later.

An optical waveguide for injected light is formed to vertically intersect the waveguide of the laser resonator 31, as shown in FIG. 3. These two optical waveguides intersect each other at the modulation region 33. The section of the waveguide for injected light also has the same structure as the laser, but each of the cap layer and p-side electrode is divided into three regions, i.e., a gain region 32, the modulation region 33, and an absorption region 34. Of these regions, the modulation region in the injected light waveguide forms the modulation region 33 to be common with the modulation range of the laser. These regions of the injected light waveguide have isotropic composition, and the section of the injected light waveguide is preferably square, as shown in FIG. 3, in order to prevent a behavior of the injected light dependent on the polarized state.

Regarding the bias voltages of the respective regions, the gain region 32' is forward-biased by a DC current source 37, and the absorption region 34 is reverse-biased by a DC voltage source 36. The biased state of the modulation region 33 is adjusted by a variable output voltage type DC voltage source 36', in a manner to be described later, so that mode locking continues stably. The bottom surface of the laser substrate forms an n-type electrode and is grounded, but is omitted in FIG. 3. While no light is injected, when light absorption is increased by changing the biased state of the modulation region 33 from forward bias to reverse bias, the laser undergoes a transition through three states, i.e., multi-mode laser oscillation, passive mode-locked laser oscillation, and laser oscillation stop states. Passive mode locking occurs because the modulation region 33 serves as a saturable absorber.

When an RZ-coded data pulse train having a bit rate fm [bit/s] is input as an input data pulse train 38 from an end facet 1, it modulates the carrier density in the modulation region 33 through interactions, e.g., absorption (optical pumping), dielectric emission, and the like, to modulate the gain (loss) or phase of laser light passing through the modulation region 33. This is a phenomenon generally called "cross gain modulation". The RZ-coded intensity-modulated data light having the bit rate fm [bit/s] has a clock spectrum at a frequency fm [Hz]. If this frequency fm [hz] is in the pulling-in frequency range of the mode-locked laser, it is locked by the mode-locked laser. As a result, an output pulse train 39 of the mode-locked laser is synchronized by the clock of the input data light.

At this time, if the modulation region 33 has a saturable absorption function, mode locking can be regarded as a mixed state of passive mode locking and active mode locking of injected pulse light. Although the saturable absorption region has a preferable effect of narrowing the pulse width, when it is observed from the viewpoint of the timing of the injected light, it induces passive mode locking, which is a phase noise source. Therefore, the bias of the modulation region must be adjusted appropriately.

<Second Embodiment>

Figure 4:
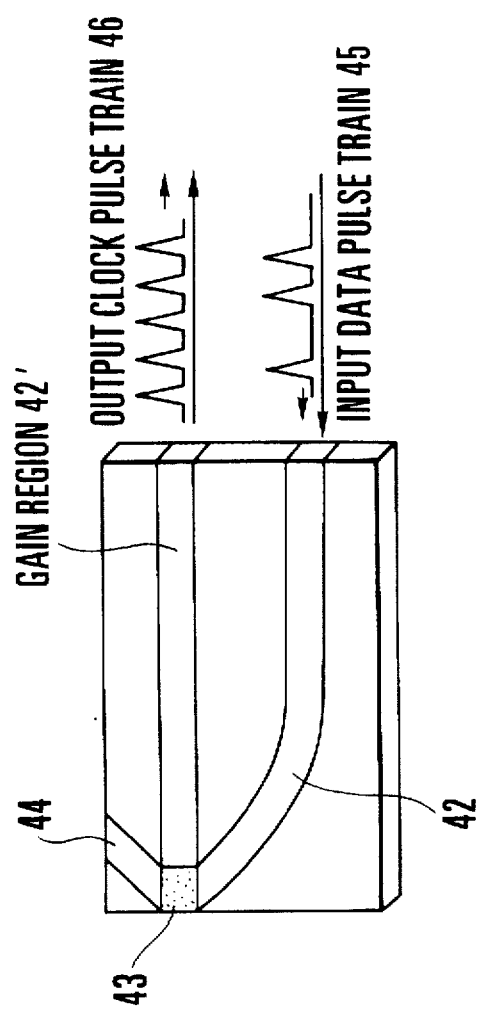
FIG. 4 is a diagram schematically showing the arrangement of an optical clock regenerator according to the second embodiment of the present invention.

FIG. 4 schematically explains the second embodiment of the present invention, which is an improvement over the first embodiment described above. The electrical wiring connection of the second embodiment is identical to that shown in FIG. 3 and is thus not shown in FIG. 4. The mode locker of a Fabry-Perot resonator type mode-locked laser is preferably arranged adjacent to a resonator mirror. If this mode locker is away from the mirror, harmonic mode locking oscillation tends to occur selectively, and mode locking oscillation with a basic repetition frequency determined by the length of the resonator may become unstable. Inversely, when harmonic mode locking is to be caused selectively, this arrangement is effective (see Japanese Patent Laid-Open No. 7-66489). In this embodiment, since a desired repetition frequency is 10 GHz, harmonic mode locking need not be utilized.

When a modulation region is set adjacent to a mirror, light must be injected sideways to the modulation region in the case of the principle shown in FIG. 1. For this reason, in the first embodiment, the waveguide of the injected light is arranged along the chip end, but this makes the manufacture of the laser difficult. To allow easy manufacture in the second embodiment, the injected light waveguide is arranged obliquely to the laser waveguide. Note that the injection angle must be set such that the injected light will not be coupled to the laser resonator.

With this arrangement, since injected light including an input data pulse train 45 which has passed through a modulation region 43 is reflected by the end facet and is returned, it can be absorbed by an absorption region 44. The directions of the optical input and output ports are orthogonal in the first embodiment to likely make difficult the adjustment of coupling to an optical waveguide outside the chip. In the second embodiment, this problem is avoided since the directions of optical input and output ports are parallel to each other, thus facilitating the adjustment of coupling of the light input and output ports and an optical waveguide outside the chip. Reference numeral 42' denotes a gain region.

In the second embodiment, although a gain region 42 and the absorption region 44 for used injected light are provided in the waveguide of the injected light, they can be omitted and, for example, a 1.3-μm passive waveguide may be formed by using the selective growth technique. This latter arrangement allows polarization non-dependency for injected light more easily.

<Third Embodiment>

FIG. 5 schematically explains the arrangement of the third embodiment of the present invention. FIG. 5 schematically shows the layer structure of a semiconductor laser, in which a detailed layer structure of the semiconductor laser other than a p-type electrode portion is not illustrated. In the third embodiment, an optical system constituted by a lens system 58 that guides injected light from an optical fiber 59 to a laser 50 is made to have an acute focusing angle so that an injected data light beam is focused on only a modulation region 53 and that the light beam that has passed through the laser 50 is diverged, as indicated by dotted lines. With this arrangement, even if the beam path of the data pulse train and the axis of the laser resonator are on one straight line, the injected light resonance in the optical resonator can be avoided. Reference numeral 56 denotes a DC voltage source; and 57, a DC current source.

<Fourth Embodiment>

Figure 6:
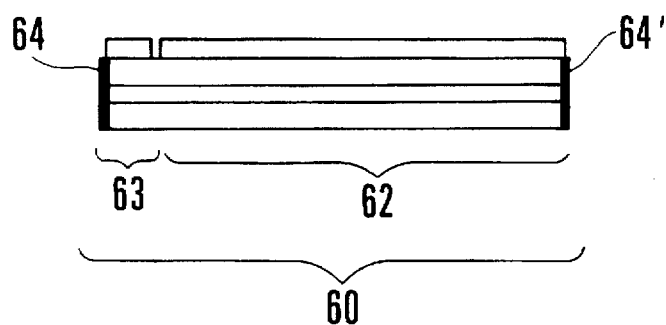
FIG. 6 is a diagram schematically showing the arrangement of an optical clock regenerator according to the fourth embodiment of the present invention.

FIG. 6 schematically explains the arrangement of the fourth embodiment of the present invention which uses the second principle shown in FIG. 2. The electrical wiring of the fourth embodiment is identical to that shown in FIG. 5 and is not illustrated. First and second dielectric multilayer coatings 64 an 64' having a high reflectivity for an oscillation wavelength and a low reflectivity for an injected light wavelength are respectively formed on a modulation region 63 side end facet and a gain region 62 side end facet of the Fabry-Perot laser resonator of a semiconductor laser 60. Used injected light which has given an optical modulation effect does not resonate in the resonator but passes through it. Although this method of setting the injected light and oscillated light to have different wavelengths is limited to only an application field where the injected light and oscillated light do not have the same wavelength, a laser utilizing this method can be manufactured easily since its arrangement is close to that of the conventional laser.

<Fifth Embodiment>

In general, the closer the wavelengths of injected light and oscillated light of a laser, the higher the effect of cross gain modulation of the laser. To obtain a large pulling-in effect, it is desired that the wavelengths of the injected light and laser-oscillated light be close to each other. If it is technically difficult to realize coatings that provide largely different reflectivities for such two wavelengths that are close to each other, or as a result of such coatings, if other problems occur, e.g., narrow allowable wavelength range of the injected light, they may be solved as follows.

Figure 7:
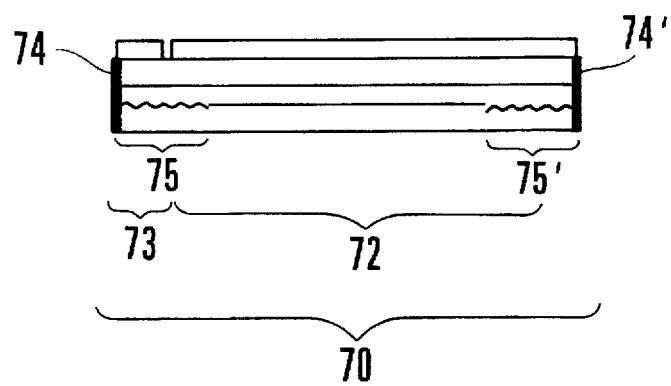
FIG. 7 is a diagram schematically showing the arrangement of an optical clock regenerator according to the fifth embodiment of the present invention.

FIG. 7 explains the fifth embodiment of the present invention, which is an improvement over the fourth embodiment. The electrical wiring of the fifth embodiment is identical to that of FIG. 5 and is not illustrated. The fifth embodiment uses distributed Bragg reflectors (DBRS) 75 and 75' as reflecting mirrors having a high reflectivity for the oscillated wavelength. This method can be realized easily since anti-reflection (AR) coatings 74 and 74' which do not reflect an injected light wavelength suffice as the coatings on the end facets of a laser 70, and can easily widen the wavelength range of the injected light. Reference numeral 72 denotes a gain region; and 73, a modulation region.

<Sixth Embodiment>

Figure 8:
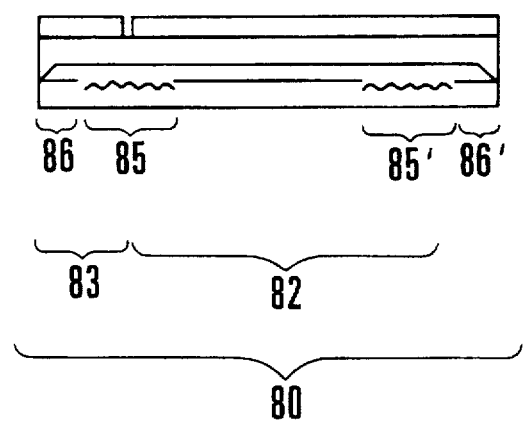
FIG. 8 is a diagram schematically showing the arrangement of an optical clock regenerator according to the sixth embodiment of the present invention.

If a reflectivity lower than in the fifth embodiment is needed, window structures 86 and 86', which are widely used as a means for greatly decreasing the reflectivity of the end facets of a semiconductor optical amplifier, may be introduced to the end facets of a semiconductor laser 80, as in the sixth embodiment shown in FIG. 8. Reference numeral 82 denotes a gain region; 83, a modulation region; and 85 and 85', DBRs. The window structure is described in detail in, e.g., "1.5 μm Band Travelling-Wave Semiconductor Optical Amplifiers with Window Facet Structure", ELECTRONICS LETTERS, Vol. 25, No. 18, August 1989, pp. 1241–1242.

In the fifth and sixth embodiments, any means for decreasing the reflectivity of semiconductor end facets, e.g., AR coating, the window structure, and the waveguide structure, are effective.

<Seventh Embodiment>

Figure 9:
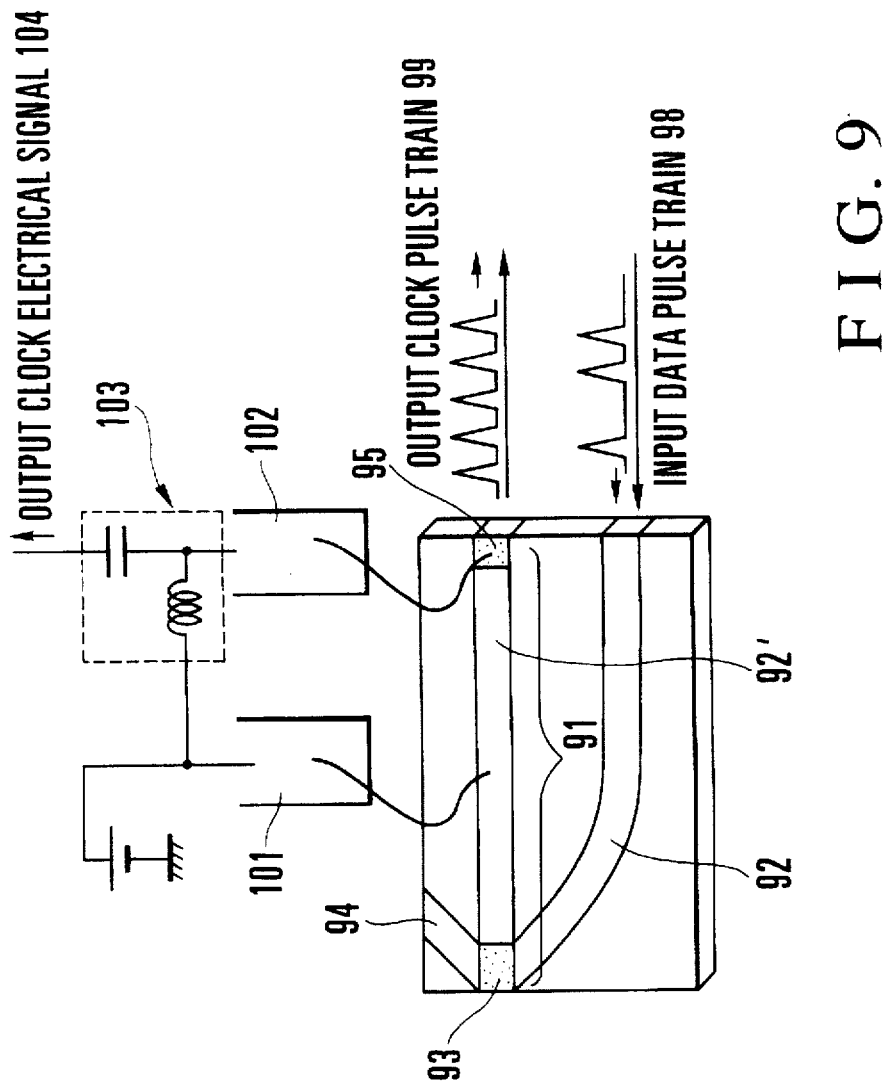
FIG. 9 is a diagram schematically showing the arrangement of an optical clock regenerator according to the seventh embodiment of the present invention.

FIG. 9 schematically explains the seventh embodiment of the present invention. In FIG. 9, a portion of the electrical wiring identical to that of FIG. 3 is not illustrated, and only a characteristic portion is illustrated in enlargement. In the first to sixth embodiments, the output clock signal is an optical signal, and an electrical clock signal can be obtained by receiving and photoelectrically converting this optical signal. The gain region of a laser, e.g., a semiconductor mode-locked laser, which directly pumps a carrier with a current also has a light-receiving function. As a result, a clock signal is superposed to the electrode as an electric signal. This clock signal can be guided to an appropriate electrical signal waveguide and extracted. Then, an electric clock signal can be provided to electric circuit processing without preparing a photoelectric converter to the outside.

Referring to FIG. 9, reference numeral 91 refers to a laser cavity, reference numerals 92, 92' refer to gain regions, reference numeral 93 to a modulation region, reference numeral 94 to an absorption region, reference numeral 98 to an input data pulse train, reference numeral 99 to an output clock pulse train 99, and reference numerals 101, 102 to electrodes An electrode corresponding to that of the gain region 42' of FIG. 4 is divided, and a divided region close to the end is used as a gain region/optical detection region 95. This region 95 is electrically connected to a gain region 92' in the DC bias manner. The gain of this region changes according to the bias condition, but under any condition a clock signal is superposed to the electrode as an electric signal. This clock signal is guided to the strip line, and is separated from a DC bias signal by a bias tee 103, thus obtaining an output clock electrical signal 104. The obtained clock signal generally has a distorted waveshape as it generally includes the harmonic frequency of the clock frequency. This distortion can be removed easily by using an appropriate low pass filtering means.

The present invention is not limited to only the above embodiments, but includes various modifications that are based on the principle of the present invention, as a matter of course. For example, although an InGaAsP-based semiconductor laser having a wavelength of 1.55 μm is explained in the above embodiments of the present invention, other semiconductor lasers having other wavelengths, other compositions, and other arrangements can realize the same function. Also, the active layer of the semiconductor laser can have an MQW (Multi-Quantum-Well) structure or a bulk structure.

As has been described above, the present invention realizes a sufficiently practical optical clock regenerator in which the instability in operation against the wavelength and polarized state of injected data light, which is the defect of optical clock regeneration using a mode-locked semiconductor laser, is avoided, and thus has a very large practical advantage.

What is claimed is:

1. An optical clock regenerator using a semiconductor mode-locked laser comprising optical modulating means for mode locking in a laser resonator, wherein said optical modulating means is driven by an intensity-modulated optical signal, and when an intensity-modulated optical data pulse train including a clock frequency component close to a frequency n(n is an integer) times or one-nth times a resonance frequency of said laser resonator is input to said optical modulating means, said mode-locked laser outputs clock pulse light locked by the frequency n times or one-nth times a clock frequency of the optical data pulse train, and the optical data pulse train and said laser resonator are spatially separated from each other.

2. A regenerator according to claim 1, wherein the optical data pulse train which is incident on said laser resonator and input to said optical modulating means has an optical path that forms a predetermined angle with respect to an optical axis of said laser resonator, and the optical path of the optical data pulse train and the optical axis of said laser resonator do not coincide with each other.

3. A regenerator according to claim 2, wherein an optical input waveguide to said optical modulating means is provided perpendicularly to an optical waveguide of said laser resonator.

4. A regenerator according to claim 2, wherein an optical input waveguide to said optical modulating means is provided obliquely to an optical waveguide of said laser resonator, and said two optical input waveguides are guided to the same facet of said mode-locked laser.

5. A regenerator according to claim 1, further comprising an optical system for focusing on said optical modulating means a beam of the optical data pulse train incident on said laser resonator, and the beam of the optical data pulse train which has passed through said optical modulating means is diverged to spatially separate from the optical axis of said optical resonator.

6. A regenerator according to claim 1, wherein said mode-locked laser comprises an optical detection region for converting an optical clock signal regenerated by an interaction with light into an electrical signal and extracting the electrical signal.

7. An optical clock regenerator using a mode-locked laser comprising optical modulating means for mode locking in a laser resonator having a pair of reflecting means, wherein said optical modulating means is driven by an intensity-modulated optical signal, and when an intensity-modulated optical data pulse train including a clock frequency component close to a frequency n (n is an integer) times or one-nth times a resonance frequency of said laser resonator is input to said optical modulating means, said mode-locked laser outputs clock pulse light locked by the frequency n times or one-nth times a clock frequency of said optical data pulse train, and at least one of said reflecting means has a high reflectivity for a wavelength of output light of said mode-locked laser and a low reflectivity for injected light including the optical data pulse train.

8. A regenerator according to claim 7, wherein one of said reflecting means comprises a dielectric multilayer film coating having a high reflectivity for a wavelength of output light of said mode-locked laser and a low reflectivity for injected light including the optical data pulse train.

9. A regenerator according to claim 7, wherein each of said reflecting means is constituted by a distributed Bragg reflector having a high reflectivity for a wavelength of laser-oscillated light and an anti-reflection coating formed on an end facet of said mode-locked laser and having a low reflectivity for the injected light.

10. A regenerator according to claim 7, wherein each of said reflecting means is constituted by a distributed Bragg reflector having a high reflectivity for a wavelength of laser-oscillated light and a window structure formed on an end facet of said mode-locked laser and having a low reflectivity for the injected light.

* * * * *